(12) United States Patent  
Chappell et al.

(10) Patent No.: US 8,700,447 B2  
(45) Date of Patent: Apr. 15, 2014

(54) SYSTEMS AND METHODS TO PRESENT SEARCH RESULTS OF BUSINESS LISTINGS

(75) Inventors: Stephen Chappell, Los Angeles, CA (US); Jay H. Lieske, Jr., Los Angeles, CA (US); Samantha Nebrich, Los Angeles, CA (US)

(73) Assignee: Yellowpages.com LLC, Glendale, CA (US)

( * ) Notice: Subject to any disclaimer, the term of this patent is extended or adjusted under 35 U.S.C. 154(b) by 1219 days.

(21) Appl. No.: 12/135,090

(22) Filed: Jun. 6, 2008

(65) Prior Publication Data

US 2009/0307018 A1 Dec. 10, 2009

(51) Int. Cl.  
*G06Q 30/00* (2012.01)

(52) U.S. Cl.  
CPC ...................................... *G06Q 30/00* (2013.01)  
USPC .......................................................... 705/14

(58) Field of Classification Search  
None  
See application file for complete search history.

(56) References Cited

U.S. PATENT DOCUMENTS

| | | | | |
|---|---|---|---|---|
| 6,078,866 | A * | 6/2000 | Buck et al. | 702/2 |
| 7,797,345 | B1 * | 9/2010 | Martino et al. | 707/792 |
| 2006/0143066 | A1 * | 6/2006 | Calabria | 705/10 |
| 2006/0218111 | A1 * | 9/2006 | Cohen | 706/45 |
| 2006/0277108 | A1 * | 12/2006 | Altberg et al. | 705/14 |
| 2007/0100653 | A1 * | 5/2007 | Ramer et al. | 705/1 |
| 2008/0255977 | A1 * | 10/2008 | Altberg et al. | 705/35 |
| 2009/0012841 | A1 * | 1/2009 | Saft et al. | 705/10 |
| 2009/0076887 | A1 * | 3/2009 | Spivack et al. | 705/10 |
| 2009/0177745 | A1 * | 7/2009 | Davis et al. | 709/204 |
| 2009/0320097 | A1 * | 12/2009 | Jackson et al. | 726/3 |

* cited by examiner

*Primary Examiner* — Bruce I Ebersman  
(74) *Attorney, Agent, or Firm* — Kilpatrick Townsend & Stockton LLP

(57) ABSTRACT

Systems and methods are provided to facilitate the presentation of listings according to levels of user interest in the listings. For example, statistics generated from tracking user interactions with the listings and/or other parameters can be used to measure or estimate a level of current user interest in a listing. Listings in search results can be presented in an order according to the levels of current user interest in the listings.

25 Claims, 8 Drawing Sheets

150

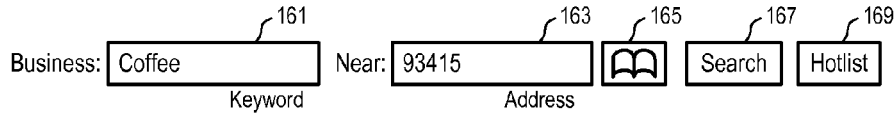

---

Star Coffee

101 Ocean View
San Francisco, CA 93415 (<u>0.1 mi, Map</u>)
1-415-281-1157 (<u>Call</u> or <u>Email</u>)

★★★★☆

Based on 2 <u>reviews</u>
<u>Rate it</u> | <u>Read reviews</u>

---

Bean Café

102 Ocean View
San Francisco, CA 93415 (<u>0.2 mi, Map</u>)
1-415-281-3765 (<u>Call</u> or <u>Email</u> or <u>Web Site</u>)
<u>Reservation</u>

★★★☆☆

Based on 17 <u>reviews</u>
<u>Rate it</u> | <u>Read reviews</u>

•
•

---

Express Café

102 Bay view
San Francisco, CA 93421 (<u>1.1 mi, Map</u>)
1-415-781-2513 (<u>Call</u> or <u>Email</u>)

★★★★★

Based on 12 <u>reviews</u>
<u>Rate it</u> | <u>Read reviews</u>

| Search<br>201 | Distance<br>203 | Hotlist<br>205 | Featured<br>207 |

Star Coffee

101 Ocean View  
San Francisco, CA 93415   86 hotlisted ⌇209

★★★★☆

Bean Café

102 Ocean View  
San Francisco, CA 93415   75 hotlisted  >

| Star Coffee | ⭐ ~211 |
|---|---|
| Rating: | ★★★★☆   > |
| Location: | 101 Ocean View<br>San Francisco, CA 93415 |
| Phone: | (415) 621-1401 |
| Web Site: | http://www.starcoffee.com/ |
| Email: | info@starcoffee.com |
| Hours: | •<br>•<br>• |

🔍 213　　　＋ 215　　　↗ 217  
Search nearby　　Add　　　　Share

Star Coffee

| Rating: | ★★★★☆ | > |
|---|---|---|
| Location: | 101 Ocean View San Francisco, CA 93415 | |

Add to Favorites ~221

Add to an Existing Plan ~223

Add to a New Plan ~225

Cancel ~227

FIG. 6

Cancel ~231         233~ Done

| Title: | Night Out |
|---|---|
| Notes: | Let's have coffee together. |
| Location: | Star Coffee 101 Ocean View San Francisco, CA 93415 Start: Thu Apr 10  8:00 PM End:                        9:00 PM  > |
| Add a Location: | > |
| Add a Friend: | • • • |

FIG. 7

From: Sam Nebrich [snebrich@xyz.com]
To: John Bus [jbus@zyx.com]
Subject: Sam shared a plan from Yellowpages.com Sam shared a plan from Yellowpages.com with you.

Night Out

Thursday, April 10, 2008
From 8:00 PM to 10:00 PM

Let's have coffee together before we head to concert.

8:00 PM – 9:00 PM:  Star Coffee
         245 — 101 Ocean View
         San Francisco, CA 93415 (Map | Direction)
         (415) 552-4055          241    243

9:00 PM – 10:00 PM: Radiohead
         121 Ocean View
         San Francisco, CA 93415 (Map | Direction)

Price: $150-200
         Age Suitability: None Specified
         Performers: Radiohead Who's Invited:

Jane Plain <jplain@tvb.com>
Jackie Brown <jbrown@dfk.com>

SYSTEMS AND METHODS TO PRESENT SEARCH RESULTS OF BUSINESS LISTINGS

FIELD OF THE TECHNOLOGY

At least some embodiments disclosed herein relate to search and presentation of information in general and, particularly but not limited to, searching for information related to business entities.

BACKGROUND

An end user may be interested in information about business entities near a particular location, such as service providers of a particular category near the current location of the end user, or a different location specified by the end user.

Thus, some web sites allow an end user to search for providers of services and/or products by entering one or more keywords and a location of interest. After a keyword search, the web site may sort and present the search results to the end user. Alternatively, a web site may organize the categories of businesses according to a predetermined hierarchy to allow a user to browse categories of providers of services and/or products.

For example, a web site may present business listings of various services and/or products based on locations and based on user entered search terms or based on selections from a predetermined set of categories.

For presentation purposes, a web site may sort the search results based on the distance between the location of interest to the end user and the locations of the business entities, or based on a different criterion, such as price, advertisement fee, user ratings, etc.

BRIEF DESCRIPTION OF THE DRAWINGS

The embodiments are illustrated by way of example and not limitation in the figures of the accompanying drawings in which like references indicate similar elements.

FIG. 3 illustrates a user interface to search and present listings of businesses according to one embodiment.

FIGS. 4-5 illustrate another user interface to search and present listings of businesses according to one embodiment.

FIGS. 6-7 illustrate a user interface to interact with a listing according to one embodiment.

FIG. 8 illustrates an electronic message generated to share an event planned using a listing according to one embodiment.

DETAILED DESCRIPTION

The following description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The present disclosure provides systems and methods to facilitate the presentation of listings according to levels of user interest in the listings. For example, a user interface tracks user interactions with listings presented via the user interface to generate statistics. A sorter (or another module) uses the statistics and/or other parameters to measure or estimate a level of current user interest in a listing. After a search engine identifies a set of listings for a search result, the sorter prioritizes the listings in the set of search results in an order according to the levels of current user interest in the corresponding listings. The disclosure includes methods and apparatuses which perform these methods, including data processing systems which perform these methods, and computer readable media containing instructions which when executed on data processing systems cause the systems to perform these methods.

Figure 1:
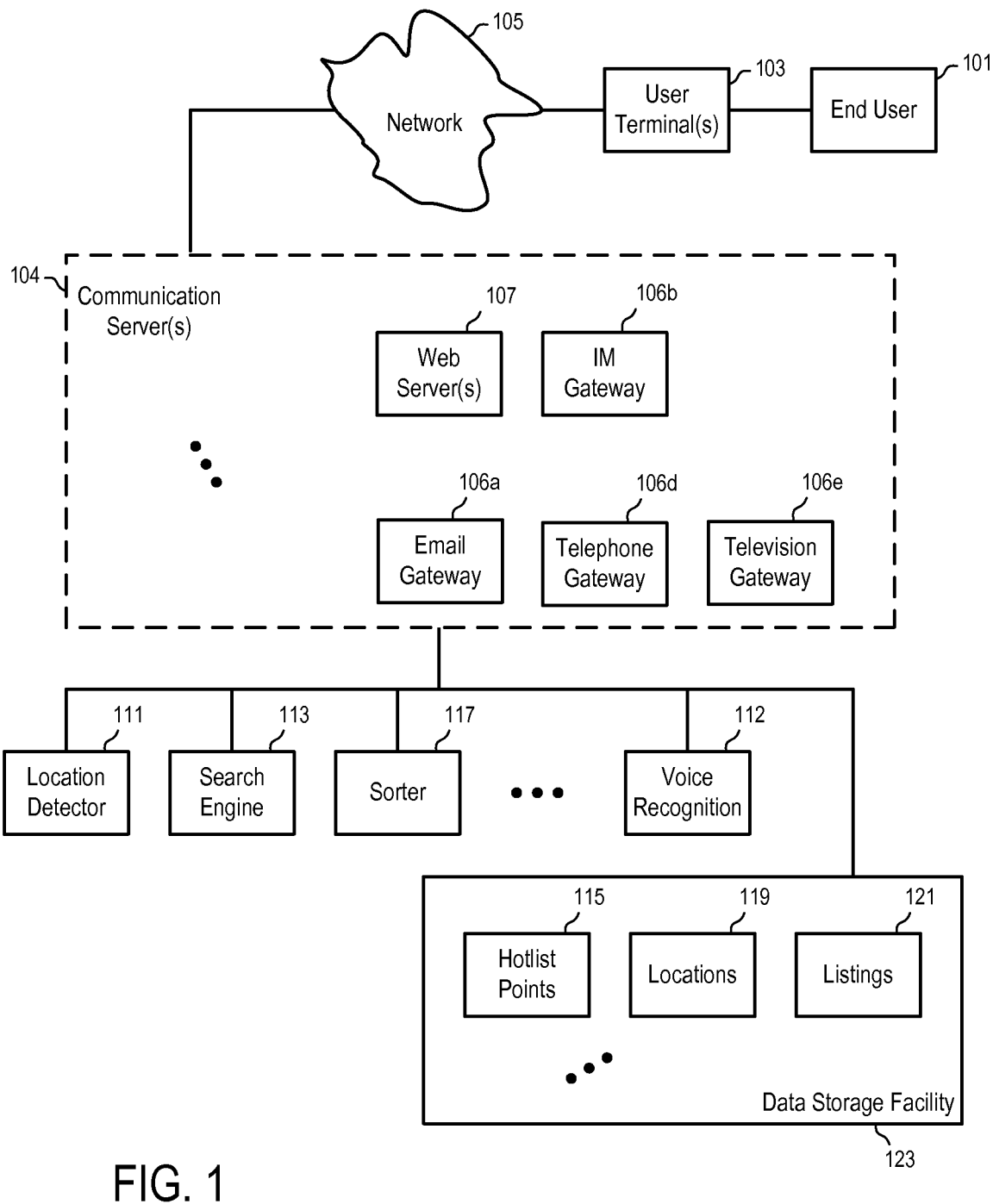
FIG. 1 shows a system to facilitate search and/or presentation of listings according to one embodiment.

FIG. 1 shows a system to facilitate search and/or presentation of listings according to one embodiment.

In FIG. 1, an end user (101) uses a user terminal (103) to submit a search request over the network (105) to a communication server (104) and/or to receive search results. The network (105) may include a local area network, a wireless data communication network, a telephone network, a cellular communication network, a telecommunication network, an interactive television network, an Internet Protocol Television (IPTV) network, an intranet, or a combination of networks, such as the Internet.

A communication server (104) may include a web server (107), an email gateway (106a), an instant messaging gateway (106b), a telephone gateway (106d), or a television gateway (106e), or other types of servers, such as an application gateway (not shown) to interface with different servers. Some embodiments may use one type of communication server (104), such as a web server (107), to receive the search request and another type of communication server (104), such as a television gateway (106e), to provide the search results. Some embodiments may use different types of communication servers (104) to service different types of user terminals (103).

In one embodiment, the web server (107) communicates with the user terminal (103) via HyperText Transfer Protocol (HTTP) and/or other types of communication protocols, such as File Transfer Protocol (FTP), Wireless Application Protocol (WAP), etc. The web server (107) may provide static web pages, dynamic web pages, and/or web services. In some embodiments, the web server (107) provides web applications to the user terminal (103) for execution in a web browser running on the user terminal (103); and the web applications may include scripts, such as Java, JavaScript, etc., for execution within an isolated environment in a browser. In some embodiments, the web server (107) may provide rich-client applications to the user terminal (103); and the rich-client application may be programmed in traditional programming languages, such as C/C++, to have full access to functions of the operating system running on the user terminal (103).

The communications server(s) (104) communicates with a location detector (111), a search engine (113), and/or a sorter (117) to process the search request and present search results based on the information stored in a data storage facility (123), such as hotlist points (115) and geographic locations (119) of listings (121). In some embodiments, the location detector (111), the search engine (113), the sorter (117) and/or other modules, such as the voice recognition system (112), are servers communicating with the communication server (104) over a network, such as a local area network, an intranet, or Internet. These servers and the communication servers (104) may run on same or separate computers. In one embodiment, there may be one or more layers of application servers between the communication server (104) and the data storage facility (123) to process the business logic and data access of the rich client applications. Alternatively, application servers may be integrated with the communication servers (104), such as the web servers (107). Thus, the disclosure is not limited to a particular type of connections among the communication servers (104), the location detector (111), the search engine (113), the sorter (117), the data storage facility (123) and other modules, such as the voice recognition system (112).

Listings (121) of businesses or people, such as restaurants, car dealers, retailer locations, service providers, gas stations, parking lots, plumbers, and the like, may have street addresses or other location parameters, such as longitude and latitude coordinates, stored as locations (119). The listings (121) may include addresses, telephone numbers, advertisements, announcements, and/or events, etc. The locations (119) may be part of the listings (121), or associated with the listings (121). In one embodiment, the listings (121) are information related to business entities at corresponding locations (119). The entities may be businesses or people. Some of the entities may be advertisers who pay advertisement fees to promote their listings (121). Some of the entities may be non-advertisers who have free listings (121).

In one embodiment, the communication servers (104) provide a user interface for user interaction with listings. For example, the web servers (107) may provide a user interface via static web pages, dynamic web pages, and/or web services, etc. For example, the web servers (107) may provide the listings (121) with links to detail information pages of the listings (121), such as a map, business hours, driving directions, etc. The web servers (107) may provide user interfaces for the users (e.g., 101) to rate the listings (121), provide reviews, view reviews from other users (e.g., 101), etc. The web servers (107) may provide user interfaces to make reservations or to make purchases via the listings (121). The web servers (107) may provide user interfaces to allow the end user (101) to plan events using the listings (121), to store or bookmark selected listings, to share the listings with friends, etc. The web servers (107) can track various different types of user interactions with the listings (121) to determine or estimate the level of user interest in the listings. The web servers (107) may provide rich client applications for execution in the user terminal to provide the user interfaces.

In some embodiments, the data storage facility (123) stores statistics of the tracked user interactions to determine an indicator of the level of user interest in a listing (121). The indicator of user interest may be in the form of hotlist points (115) of a listing (121). In one embodiment, the hotlist points (115) represent the popularity of a listing (121) among a set or subset of users, such as users of iPhone or iTouch from Apple, Inc. The data storage facility (123) may store the statistics as logs of web access to the listings (121) and/or other information related to the listings (121). The data storage facility (123) may store the statistics in the form of counts of various events associated with the user interactions.

In one embodiment, the data storage facility (123) associates the statistics with the date and/or time of the user interactions to determine the level of user interest based on recent user interactions to reflect the change of user interest over time. For example, the current interest may not include the statistics of user interactions that occurred before a threshold of a time period has passed. For example, the web server (107) (or another module not shown in FIG. 1, such as an application server) may weight the statistics of user interactions based on the elapsed time periods since the corresponding user interactions to determine the levels of user interest.

In one embodiment, the data storage facility (123) associates (not shown in FIG. 1, such as an application server) the statistics with the identities of the users (e.g., 101) who interacted with the listings (121). The web server (107) (or another module not shown in FIG. 1, such as an application server) may use the social relationship between a user (101) who is currently requesting the search result and the users (e.g., 101) who interacted with the listings in the past to customize the estimated level of user interest from the point of view of the requesting user (101).

For example, the web server (107) (or another module not shown in FIG. 1, such as an application server) may exclude or discount the user interactions performed by those who are not within a same group of the users as the end user (101) who is currently requesting the search result, in determining the level of user interest for the requesting user (101).

For example, in a social network, the user interactions of the friends of the requesting user (101) may have more weight than the user interactions of the friends of the friends of the requesting user. Thus, the web server (107) (or another module not shown in FIG. 1, such as an application server) can weight the user interactions according to the social distance between the requesting user (101) and the users who performed the user interactions to determine the level of user interest based on an identity of the end user (101).

For example, when the requesting user (101) uses the user terminal (103) of a particular type (e.g., a mobile telephonic apparatus, such as iPhone or iPod Touch from Apple, Inc.), the web server (107) (or another module not shown in FIG. 1, such as an application server) may exclude or discount the user interactions on other types of user terminals (103) in the determination of the levels of user interest for the requesting user (101). The determined (or estimated) level of user interest reflects the preference of users of the particular type of user terminals (103). The level of user interest is thus based on an identity of a group of users to which the end user (101) belongs.

In one embodiment, the location detector (111) determines a location of interest to the end user (101) related to the search request. The end user (101) may explicitly specify the location of interest in the search request; and the location detector (111) extracts the location of interest from the search request.

Alternatively, the end user (101) may implicitly specify the location of interest based on a preference stored and associated with identification information of the end user (101) or the user terminal (103).

In some embodiments, the location detector (111) automatically identifies the location of interest based on determining the current location of the user terminal (103) that is used to submit the search request. For example, the location detector (111) may determine the location of the user terminal (103) based on a connection point the user terminal (103) used to access the network (105) (e.g., based on the location of a wireless network access point, a base station of a cellular communication system, or a connection point to a wired network). In some embodiments, the user terminal (103) automatically determines its current position (e.g., via a satellite positioning system, or a cellular positioning system) and transmits the determined or estimated position to the web server (107) with the search request, or provides the position in response to a request from the location detector (111).

In FIG. 1, the search engine (113) retrieves information from the data storage facility (123) according to the search request. The sorter (117) ranks the listings in the search results according to the hotlist points (115) the listings (121) have accumulated through user interactions.

In one embodiment, the user terminal (103) is a data processing system, such as a notebook computer, a personal computer, a workstation, a network computer, a personal digital assistant (PDA), a mobile phone, a cellular phone, a television set with or without a set top box, a game console, an electronic kiosk, microprocessor-based or programmable consumer electronics, and the like.

In one embodiment, the user terminal (103) includes a web browser which allows the end user (101) to submit a search request to one of the web servers (107) for location dependent information, such as a listing (121) of businesses or people, such as restaurants, car dealers, retailer locations, service providers, gas stations, parking lots, plumbers, and the like. Alternatively, the user terminal (103) may provide the search request via other communication channels, such as email, short message service (SMS), instant messaging (IM), telephone connection, etc. For example, the user terminal (103) may provide the search request to an email gateway (106a) via email, or to an IM gateway (106b) via instant messaging, or to a telephone gateway (106d) via a telephone call, or to a television gateway (106e) via an interactive television system. Some embodiments may use other types of gateways not shown in FIG. 1, such as gateways for SMS. Thus, the disclosure is not limited to the examples or combinations illustrated in FIG. 1.

In some embodiments, the end user (101) may use one user terminal (103) to submit the request and another user terminal (103) to receive the results. For example, the user (101) may submit the search request via an SMS message through one user terminal (103), and receive the search results at another user terminal (103) via email. For example, the user may submit the search request via voice through one user terminal (103) and receive the search results via a web page at another user terminal (103) or at the same user terminal (103). For example, in one embodiment, the user (101) may use a mobile phone as the user terminal (103) to transmit voice information, via a data connection through the network (105) and the web server (107) (or email gateway (106a), or IM gateway (106b), or other data communication gateways), or a telephone connection through a telephone gateway (106d)), to a voice recognition system (112) to formulate a search and receive a web page or email at the same user terminal (103) or at another user terminal (103) that shows the results of the search.

In one embodiment, one computer system implements the web servers (107), the location detector (111), the search engine (113), and the sorter (117). Alternatively, different processes running on one or more shared computers may implement some of the components (107, 111, 113, and 117). For example, one computing module, thread, or process may implement multiple of the components (107, 111, 113, and 117). In some embodiments, special purpose data processing systems implement the one or more of the components (107, 111, 113, and 117), such as using Application-Specific Integrated Circuit (ASIC) or Field-Programmable Gate Array (FPGA). In some embodiments, processes running according to software instructions on general purpose data processing systems, such as general purpose personal computers or server computers, can implement the components (107, 111, 113, and 117). Thus, the implementations are not limited to hardware, software, or particular combinations of hardware and software.

Different embodiments may implement the data storage facility (123) in different ways. For example, one or more data processing systems may store the information about the hotlist points (115), the locations (119) and the listings (121). For example, one or more relational or object oriented databases, or flat files on one or more computers or networked storage devices, may store the information about the hotlist points (115), the locations (119) and the listings (121). In some embodiments, a centralized system stores the information about the hotlist points (115), the locations (119) and the listings (121); alternatively, a distributed system, such as a peer to peer network, or Internet, may store the information about the hotlist points (115), the locations (119) and the listings (121).

Figure 2:
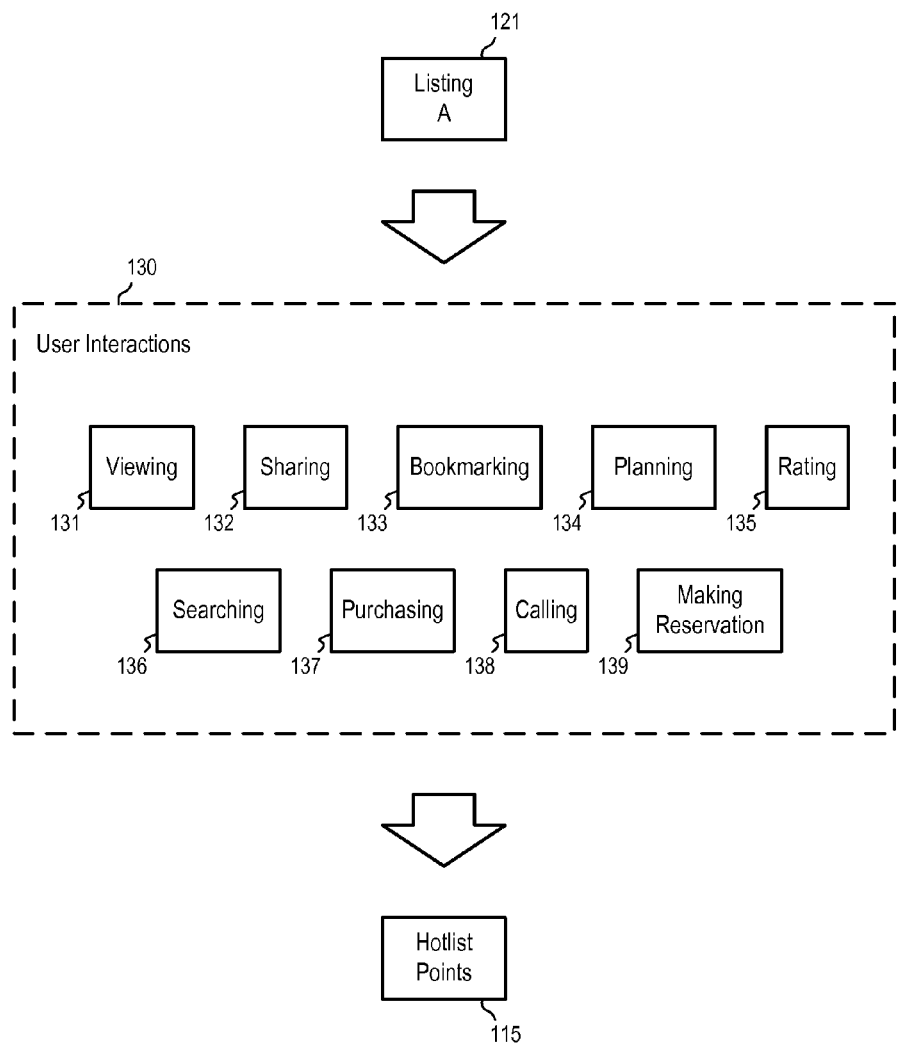
FIG. 2 illustrates a process to estimate a level of user interest in a listing according to one embodiment.

FIG. 2 illustrates a process to estimate a level of user interest in a listing according to one embodiment.

In FIG. 2, a communication server (104), such as a web server (107), presents a listing (121) via a user terminal (103) for various different types of user interactions (130), such as viewing (131), sharing (132), bookmarking (133), planning (134), rating (135), searching (136), purchasing (137), calling (138), making reservation (139), etc. The web servers (107), the user terminal (103) and/or other servers, such as the telephone gateway (106d), email gateway (106a), etc., can track the user interactions (130) to determine the number of hotlist points (115) for the listing (121) to represent the level of user interest in the listing (121). The web server (107) and/or the user terminal (103) can track more or less than the types of user interactions shown in FIG. 2 to determine or estimate the level of user interest.

For example, the web server (107) and the user terminal (103) may present the listing (121) in response to a search request from an end user (101). In response to the presentation of the listing (121) to the end user (101), the web server (107) adds a predetermined number of hotlist points (115) to the previous hotlist points (115) of the listing (121).

For example, the web server (107) and the user terminal (103) may present the listing (121) with a link to a web page for further detail information. In response to the end user (103) selecting the link to view the web page for further details, the web server (107) adds a predetermined number of hotlist points (115) to the previous hotlist points (115) of the listing (121). For example, the listing (121) may include a link to view a map showing a geographic area near the location of the business entity. For example, the listing (121) may include a link to view business hours, a detailed description, a review, and/or a website of the business, etc.

In one embodiment, the web server (107) and/or the user terminal (103) can identify the end user (101) who viewed the listing (121) and the date and time of the viewing activity to ensure that the listing (121) accumulates no more than a predetermined number of hotlist points (115) from the viewing activity of the end user (101) within a period of time. In one example, a listing (121) can accumulate up to a predetermined number of hotlist points (115) for all viewing activities by the same end user (101) within a predetermined time period (e.g., one day, a week, or a month). In another example, a listing (121) can accumulate a number of hotlist points (115) weighted according to the number of previous views by the same end user (101) within a predetermined time period to phase out the contribution by excessive subsequent viewing activities.

In one embodiment, the web server (107) identifies the end user (101) based on a characteristic of the user terminal (103), such as a phone number, an Internet address, etc. In another embodiment, the web server (107) identifies the end user (101) based on a user name of the end user (101), after the web server (107) authenticates the end user (101).

In one embodiment, the user terminal (103) presents the listing (121) with a user interface element selectable to initiate the sharing (132) of the listing (121) with a friend of the end user (101). For example, the user terminal (103) and/or the web server (107) may send the listing (121) or a link to the listing (121) to the friend of the end user (101) via email using the email gateway (106), or via voice mail using the telephone gateway, or via IM using IM gateway (106*b*), or via SMS or other communication channels using gateways not shown in FIG. 1. In response to the sharing (132) of the listing (121) via the user terminal (103) and/or the web server (107), the web server (107) (or another module not shown in FIG. 1, such as an application server) adds a predetermined number of hotlist points (115) to the previous hotlist points (115) of the listing (121).

In one embodiment, after the end user (101) sharing (132) the listing (121) with another end user (101) via a message, such as an email message or an SMS message, the communication server (104) can monitor the user interaction with the message to add hotlist (115) points to the listing (121). For example, the user may view the message, forward the message, or investigate the message (e.g., via a search related to the shared listing (121)). For example, the message may include a link to the listing (121), a link to a map, a detail page, or a website related to the listing (121), a link to perform a search of other listings near the listing (121), etc. The communication servers (104) may monitor the selection of the links provided in the message to add hotlist points to the listing (121).

In one embodiment, the user terminal (103) presents the listing (121) with a user interface element selectable for bookmarking (133). For example, the end user (101) may select the user interface element to add the listing (121) to a list of favorites for subsequent viewing. The web server (107) adds a predetermined number of hotlist points (115) to the previous hotlist points (115) of the listing (121) in response to the end user (101) adding the listing (121) to his/her list of favorites.

In one embodiment, the user terminal (103) presents the listing (121) with a user interface element usable for planning (134) an event. For example, the end user (101) may select the user interface element to use the listing (121) to indicate a location for an event scheduled in a calendar or a plan. The end user (101) may store the event for subsequent reference, or share the plan with one or more friends. The web server (107) adds a predetermined number of hotlist points (115) to the previous hotlist points (115) of the listing (121) in response to the end user (101) selecting the user interface element to plan an event using the listing (121).

In one embodiment, the user terminal (103) presents the listing (121) with a user interface for rating (135) the listing (121). For example, the end user (101) may use the user interface to rate the listing (121) from zero to five stars. The web server (107) adds a predetermined number of hotlist points (115) to the previous hotlist points (115) of the listing (121) in response to the end user (101) rating the listing (121) above a threshold (e.g., three stars). In one embodiment, the end user (101) may provide a review message for the listing (121); and the web server (107) adds a predetermined number of hotlist points (115) to the previous hotlist points (115) of the listing (121) in response to the review message.

In one embodiment, the user terminal (103) presents the listing (121) with a user interface element selectable to initiate a search in an area near the location of the listing (121). For example, the end user (101) may use the user interface element to request a search near the street address of the business or event of the listing (121). The search engine (113) then uses the listing (121) as an indicator of location of interest in the new search. The web server (107) adds a predetermined number of hotlist points (115) to the previous hotlist points (115) of the listing (121) in response to the end user (101) using the listing (121) to specify the location of interest for a search.

In one embodiment, the end user (101) may perform a search using the name of the business of the listing (121). Since the end user (101) is specifically looking for the listing (121), the web server (107) adds a predetermined number of hotlist points (115) to the previous hotlist points (115) of the listing (121) after the user terminal (103) presents the listing (121) to the end user (101) in response to such a name search.

In one embodiment, the user terminal (103) presents the listing (121) with a user interface element selectable to initiate a telephone call to an entity of the listing (121), such as the operator of the listing (121), the advertiser of the listing (121), the business owner of the listing (121), etc. The web server (107) adds a predetermined number of hotlist points (115) to the previous hotlist points (115) of the listing (121) in response to the end user (101) calling (138) via the user interface element presented listing (121).

In one embodiment, to track the calls initiated via the listing (121), a separate telephone number is presented with the listing (121); and a telephone connection server receives the user phone call to the separate telephone number and forwards the phone call to the entity of the listing (121). In one embodiment, when the user interface element is selected, the telephone connection server calls back the end user (101) and calls the entity of the listing (121) separately to connect the end user and the entity of the listing (121).

In one embodiment, the user terminal (103) presents the listing (121) with a user interface to initiate a purchase (137) or a reservation (139) related to the listing (121). For example, the listing (121) may present a restaurant; and the end user (101) can use the user interface to make a reservation at the restaurant over Internet. For example, the listing (121) may present a movie theater; and the end user (101) can use the user interface to purchase one or more tickets for a movie show. The web server (107) adds a predetermined number of hotlist points (115) to the previous hotlist points (115) of the listing (121) in response to the end user (101) making a reservation (139) or purchasing (137) via the listing (121).

In one embodiment, the listings (121) may accumulate hotlist points (115) via ways other than user interactions with the listings (121). For example, a listing (121) may obtain a number of points for having a status of an advertisement. An advertiser may pay a monthly fee to advertise the listing (121), or pay a fee in response to a user selecting a link of the listing (121) to view (131) a web site of the advertiser, or pay a fee in response to a user calling (138) the advertiser via the listing (121). The system, or the advertiser, may specify the advertisement fee.

In one embodiment, a listing (121) can obtain hotlist points (115) for advertising but not based on the amount of the advertisement fee paid. For example, the advertiser may choose to pay more advertisement fees for increased number of presentations, for higher priorities, and/or for presentation of a banner or video advertisement with the listing (121).

However, the listing (121) gets the same hotlist points (115) for advertising as when the advertiser pays a less amount of advertisement fees.

Alternatively, a listing (121) can obtain hotlist points (115) according to the amount of the advertisement fee paid. For example, a listing (121) can obtain a predetermined number of hotlist points (115) in response to the advertiser paying more than a threshold level of advertising fees in a predetermined period of time. For example, a listing (121) can obtain a number of hotlist points (115) that are proportional to the advertisement fees paid by the advertiser (or offered by the advertiser).

The web server (107) may add different numbers of hotlist points (115) in response to different user interactions (130), such as viewing (131), sharing (132), bookmarking (133), planning (134), rating (135), searching (136), purchasing (137), calling (138), making a reservation (139), etc. The different numbers of hotlist points (115) represent different weights in different user interactions (130) towards the level of the user interest.

In one embodiment, the web server (107) combines the statistics about the user interactions (130) and weights for different types of the user interactions (130) to compute the level of the user interest.

For example, in one embodiment, hotlist points (115) of a listing (121) is a function of statistics such as selection percentile, average user rating, and advertiser value.

In one embodiment, selection percentile is an n-tile partition of the number of selections of presented listings (121). For example, when the end user (101) clicks a link of a listing (121) to view a page showing additional information about the listing (121), the number of selections of the listing (121) increases by one. Thus, the number of selections of a listing (121) may be a potentially unbounded parameter. A listing in the group of the top 1% ranked according to the number of selections gets a selection percentile 100; and a listing at $33^{rd}$ percentile will get a value of 67. Thus, the selection percentile is a bounded parameter corresponding to the number of selections, which may be a parameter without a predetermined upper bound.

The use of the selection percentile in the determination of the hotlist points (115) can limit the impact on the hotlist values of other listings (121) by frequently selected listings (121) that have very high numbers of selections. Further, the use of the selection percentile can mitigate the effects of "click abuse", where a business owner could "click" on his/her listings to improve its ranking.

In some embodiments, user selections of different links of a listing (121) to view different pages, such as a map, driving directions, details, etc., may have different weight in counting the number of selections for the determination of selection percentile. Further, each end user (101) may contribute only up to a predetermined number of selections to a listing (121) within a predetermined time period (e.g., one click per month), to prevent click abuse.

In one embodiment, end users (e.g., 101) can provide different ratings to a listing (121). For example, a user rating can be between zero to five; and thus, average user rating is a bounded value having predetermined bounds.

In one embodiment, advertiser value includes points and tier value for subscription listings. For example, when a listing pays a certain level of subscription, the listing has a predetermined tier value corresponding to the subscription level of the listing. Further, the listing may pay additional options, such as banner advertisements, video advertisements, etc. The options have corresponding predetermined points. Thus, advertiser value of a listing is a function of subscription level and the listing options. Since the available subscription levels and options are finite, advertiser value is also a bounded value having predetermined bounds.

In one embodiment, hotlist points (115) of a listing are a weighted sum of selection percentile, average user rating, and advertiser value. For example, hotlist points (115) can be computed based on the following expression.

$$w_a \times \text{Selection}_{Percentile} + w_b \times \text{Rating}_{Average} + w_c \times \text{Value}_{Advertiser}$$

where $\text{Selection}_{percentile}$ represents selection percentile; $\text{Rating}_{Average}$ represents average user rating; and $\text{Value}_{Advertiser}$ represents advertiser value; and $w_a$, $w_b$, and $w_c$ are predetermined coefficients. For example, in one embodiment, selection percentile is in the range [0, 100], average user rating in [0, 5], and advertiser value in [0, 35000]; and $w_a=0.005$, $w_b=0.08$, and $w_c=1/350000$. Thus, selection percentile contributes up to 50% of "hotness", average user rating up to 40%, and advertiser value up to 10%; and hotlist points (115) are in the range [0, 1]. Other combinations of weight coefficients can also be used to empirically determine the indicator of popularity among a group of end users (e.g., 101).

Other embodiments may use different types of expressions, such as $\text{Selection}_{Percentile} \times \text{Rating}_{Average} \times \text{Value}_{Advertiser}$. Thus, the disclosure is not limited to particular types of expressions.

Some embodiments use a subset of the user interactions illustrated in FIG. 2 to compute the indication of the level of user interest (e.g., hotlist points (115)); and some embodiments use more user interactions than those illustrated in FIG. 2. Thus, the disclosure is not limited to the use of a particular set of user interactions.

FIG. 3 illustrates a user interface to search and present listings of businesses according to one embodiment. In FIG. 3, a user terminal (e.g., 103) provides a search user interface (150), which includes an input box (161) to receive one or more keywords, and an input box (163) to receive a location of interest. The end user (101) may alternatively use the icon button (165) to select the location of interest from a list of bookmarked locations.

In one embodiment, a bookmarked location can be a listing (121) the end user previously added to a list of favorites. The listing (121) has a location (119); and the bookmarked listing (121) represents the location (119) corresponding to the listing (121). An end user (101) can select the bookmarked listing (121) as a way to specify a location of interest. For example, the end user (101) can select the bookmarked listing (121) to search for other businesses near the location of the bookmarked listing (121).

In one embodiment, the end user (101) may select an entry of an address book to specify the location of interest in the input box (163). In one embodiment, the end user (101) may select a location from an interactive map.

In FIG. 3, after the end user (101) specifies the keyword in the input box (161) and the location of interest in the input box (163), the end user (101) can select the search button (167) to search for listings (121) of businesses that match the keyword and that are located near the location of interest. The end user (101) may select the icon button (169) to request listings (121) of "hot" businesses that match the keyword and that are located near the location of interest.

In one embodiment, "hot" businesses are those who have high levels of user interest. The sorter (117) may sort the search results according to the levels of current user interest for presentation on the user terminal (103) via the web servers (107) (e.g., based on the hotlist points (115) of the listings (121)).

In one embodiment, "hot" businesses are those who are popular among a group of end users (101), such as the end users (101) of a particular type of user terminals (103), such as the end users (101) of iPhone or iPod Touch from Apple, Inc., end users (101) of interactive television (e.g., via U-verse from AT&T), end users (101) of a type of web browser, etc.

After the search interface (150) receives the selection of the search button (167) (or the icon button (169) for popular listings (121)), the user terminal (103) submits the search request to web server(s) (107).

In one embodiment, the end user (101) may select the "hotlist" button (169) without specifying a keyword in the input box (161) and/or a location of interest in the input box (163). When the location of interest is not specified, the location detector (111) detects or estimates the current location of the user terminal (103) as the location of interest. When no keyword is specified in the input box (161), the search engine (113) performs the search based on the location of interest; and the search results are not limited to a particular category or keyword. The search engine (113) and/or the sorter (117) can select or order the listings (121) based on the level of user interest in listings (121) near the location of interest.

In one embodiment, the end user (101) implicitly specifies the location of interest based on the location of the user terminal (103), or based on a preference setting of the end user (101). In one embodiment, the location detector (111) determines the location of the user terminal (103) or the preference setting of the end user (101); and the input box (163) presents the location determined by the location detector (111) for verification and/or for modification.

For example, the user terminal (103) (e.g., with a global positioning system (GPS) unit) or the location detector (111) can automatically determine the current location of the user terminal (103) that presents the search user interface (150). The input box (163) displays the automatically determined location of the user terminal (103) as a default location; and the user may specify an alternative location via the input box (163) (or via the icon button (165)).

In FIG. 3, the user interface (150) presents the search results under the input boxes (161 and 163). In the example illustrated in FIG. 3, the user interface (150) presents listings (121) of business products and services in response to a search request.

In FIG. 3, the user interface (150) presents the listings (121) in an order according to the distance to location of interest. The measure of distance to the location of interest may be based on an estimated transportation time, a driving distance, a line-of-sight distance, according to user ratings, or according to the level of user interest, etc. In FIG. 3, if the end user (101) selects the icon button (169), the user interface (150) changes the order of the listings (121) to present the listings (121) according to the level of user interest (e.g., based on the hotlist points (115) of the listings (121)).

In one embodiment, the listing (121) represents a business of products or services. The technologies disclosed herein can be used, for example, in a web site such as YELLOWPAGES.COM. The business entity of the listing (121) may pay a fee to become an advertiser or not pay a fee to have a free listing (121).

In FIG. 3, the user interface (150) presents a listing (121), such as the listing (121) for "Star Coffee", with various information about the business entity of the listing (121), including the street address, a telephone contact (153), a distance (155) to the location of interest, a user rating (151), a link (157) to initiate a telephone call to an entity of the listing (121), and other user interface elements (e.g., 159, 171-179) to interact with the listing (121).

For example, the end user (101) may select the link (159) to initiate a reservation process.

For example, the end user (101) may select the icon button (171) to search near the location (119) of the listing (121) for "Star Coffee", using the location (119) of the listing (121) for "Star Coffee" as a location of interest.

For example, the end user (101) may select the icon button (173) to share the listing (121) with a friend via email, SMS, IM, etc. In one embodiment, after the end user (101) selects the icon (173), a further user interface allows the end user (101) to specify an email address, a mobile phone number, or an instant messaging user identifier to send the listing (121), or a link to the listing (121), via email, SMS, or IM.

For example, the end user (101) may select the icon button (175) to add the listing (121) to a list of favorite listings of the end user (101).

For example, the end user (101) may select the icon button (177) to use the listing (121) as an indicator of a location for planning or scheduling an event. The user terminal (103) and/or the data storage facility (123) may store the event in a calendar and/or share the event with one or more friends of the end user (101) via email, SMS, IM, voice mail, fax, etc. In one embodiment, after the end user (101) selects the icon button (177), the end user (101) can select an event from a list of events planned by the end user (101) to add the listing (121) to the selected event or choose to add the listing (121) as a location in a new event.

For example, the end user (101) may select the icon button (179) to obtain driving directions to "Star Coffee" (e.g., starting from the location of interest specified in the entry box (163), or from the current location of the user terminal (103)).

In one embodiment, the advertiser pays a predetermined fee for priority in the display of the listings (121). For example, the advertiser may pay a monthly advertisement fee, or an advertisement fee charged for a predetermined number of presentations, to obtain a high priority in the ranking of the listings (121).

In another embodiment, the advertiser pays a predetermined fee when a link presented in the listing (121) forwards the end user (101) to a web location specified by the advertiser, such as a web site of the advertiser. In one embodiment, the advertiser pays a predetermined fee when the end user (101) calls the advertiser using the telephone contact provided in the listing (121).

In one embodiment, the operator of the search engine (113) specifies the predetermined advertisement fees. In another embodiment, the advertiser specifies and offers the predetermined advertisement fees; and the advertisers can adjust the offer of the advertisement fees to balance the need for a high ranking and the cost.

In FIG. 3, the listings (121) provide the "call" link to allow a customer to request a call back to the customer for a phone connection to the advertiser. When a telephonic device (e.g., a mobile phone or a computer having a phone implemented partially via software, etc.) presents the listing (121), the customer can use the "call" link to initiate a call from the telephonic device.

In FIG. 3, the listings (121) provide the "email" link to send the listing (121) and/or the phone number via email to an address specified by the user. In some embodiments, the user interface (150) also provides the end user (101) with an option to send the phone number via SMS, an option to save the listing (121) as a note, etc.

In FIG. 3, the listing (121) for "Bean Cafe" includes a "web site" link, which when selected by the end user (101) forwards the end user (101) to the web site of the business "Bean Cafe", or an information page hosted on the web server (107) to provide further details about the business, such as the business hours, payment options accepted by the business, a detailed description of the business, videos related to the business, etc.

In FIG. 3, the listings (121) also include links related to customer ratings of the businesses based on feedback from prior customers of the business. For example, the end user (101) may read reviews wrote by other users, or write about and/or rate the business.

In some embodiments, the listings (121) include banner or video advertisements (not shown in FIG. 3) from the corresponding entities of the listings (121). The listings (121) may include links to web locations specified by the advertisers.

In one embodiment, the heading "Star Coffee" includes a link to a web site of the business/advertiser of the listing (121). When the end user (101) selects the link, the link directs the end user (101) to the web site of the business/advertiser; and the advertiser may pay a per-selection advertisement fee, for the end user (101) that is directed by the link to the web site of the business/advertiser.

Alternatively or in combination, the end user (101) may call the telephone contact (153) provided in the listing (121); after a connection server connects the telephone call from the end user (101) to the business/advertiser, the advertiser may pay a per-call advertisement fee, responsive to the call that is directed by the telephone contact (153) to the business/advertiser.

In one embodiment, to track the calls forwarded to the business/advertiser, the listing (121) provides a telephone number of a connection server as the telephone contact (153) of the listing (121). When the connection server receives the call to the telephone number of the connection server, the connection server forwards the call to the telephone number of the business/advertiser, or makes a separate call to the telephone number of the business/advertiser and bridges the calls to make the connection.

FIGS. 4-5 illustrate another user interface to search and present listings of businesses according to one embodiment. In one embodiment, a user terminal (103) implementing the user interface as illustrated in FIGS. 4-5 is a mobile computing device having radios for wireless access to the web servers (107), such as radios for cellular communications, wireless local area network communications, wireless personal area network communications, etc. The mobile computing device may be a cellular phone with an integrated Internet browser and a touch screen, with or without a keyboard. The mobile computing device may be a personal digital assistant with wired or wireless connections for network data communications. For example, the mobile computing device may be an iPhone or iPod Touch from Apple, Inc.

In FIG. 4, the user interface (200) includes a set of icon buttons (201-207). The end user (101) can select the search button (201) to request an interface (not shown) to specify a search criterion, such as a keyword, a location of interest, etc. The user interface (200) presents the search results under the set of icon buttons (201-207).

The end user (101) can select the icon button (203) to sort the search results according to the distance to the location of interest.

The end user (101) can select the hotlist button (205) to sort the search results according to the level of user interest represented by the hotlist points (115). In one embodiment, before the end user (101) specifies a search criterion using the search button (201), the end user (101) can directly select the hotlist button (205) to request a list of "hot" businesses near the current location of the user terminal (103) on which the user interface (200) is.

FIG. 4 illustrates a presentation of a set of listings (121) sorted by the sorter (117) according to hotlist points (115). The end user (101) can select a listing (121) from the set of listing (121) (e.g., by selecting the icon (209)) to view details of the listing (121).

In FIG. 4, the end user (101) can select the icon button (207) to request a list of featured listings (121). In one embodiment, the search engine (113) selects the featured listings (121) from a subset of the listings (121) that are advertised. In one embodiment, the search engine (113) uses a set of predetermined criteria to ensure the quality of the featured listings (121). For example, one criterion may require that a featured listing (121) have a user rating above a threshold. The sorter (117) may rank the featured listings (121) in an order according to the advertisement fees of the listings (121).

The user interface (210) in FIG. 5 shows a display of details of the listing (121) for "Star Coffee". It provides information about phone number, web site, email contact, business hours and/or other information such as the address, user rating, etc. In FIG. 5, the end user (101) can select the icon button (213) to search nearby the location of the listing (121), select the icon button (217) to send a message to another user to share the information about the listing (121), or select the icon button (215) to add the listing (121) to a favorite list, an existing event, or a new event.

In one embodiment, the listing (121) shows an icon (211) to indicate that the listing (121) is already in the favorite list.

FIG. 6 shows a user interface when the icon button (215) is selected. The user interface includes a set of buttons (221-227) that provide the user with the options to add the listing (121) to a favorite list, an existing event, or a new event, or cancel the operation.

For example, the end user (101) can select the "Add to Favorites" button (221) to add the listing (121) to favorites for future access. For example, the end user (101) can select the "Add to an Existing Plan" button (223) to add the listing (121) as a location indicator in an existing plan scheduled in a calendar. For example, the end user (101) can select the "Add to a New Plan" to generate a new plan of an event, using the location of the listing (121) as a location of the event.

FIG. 7 shows a user interface to interact with an event planned using a selected listing (121) for "Star Coffee". In FIG. 7, the event shows the location of the listing (121) for "Star Coffee" as the location of the event; and the end user (101) may add additional locations by selecting a listing (121) from a list of favorites, or selecting an entry from an address book, or typing in an address for the location.

In FIG. 7, the end user (101) can also add a list of one or more friends to the planned event by selecting the friends from an address book or by typing in contact information, such as email address, phone number, IM user identifiers, etc. When the end user (101) shares the plan, the user terminal (103) and/or the web server (107) can automatically generate a message for notifying the friends via email, SMS, IM, and/or voice mail, fax, etc.

FIG. 8 illustrates an electronic message generated to share an event planned using a listing (121) according to one embodiment. In FIG. 8, the user terminal (103) or the web server (107) automatically generates the message that includes the location of the planned event based on the selected listing (121) for "Star Coffee". The message includes a link (245) to the listing (121) for "Star Coffee", a link (241) to a map showing an area near "Star Coffee", and a link (243) to a direction to "Star Coffee".

In the example in FIG. 8, the message also includes a link to a published event "Radiohead". Since the end user (101) has selected the event listing (121) for "Radiohead" as the additional location of the event for "Night Out", the message shows the location of the event listing (121) for "Radiohead" as the location of the scheduled plan during the time period 9:00 PM-10:00 PM. The user terminal (103) or the web server (107) automatically inserts some of the key information fields, such as the price, age suitability, performers, etc., into the message based on the listing (121) for "Radiohead".

In the example in FIG. 8, the message also includes a list of the friends who have been invited by the end user (101) to the plan.

Figure 9:
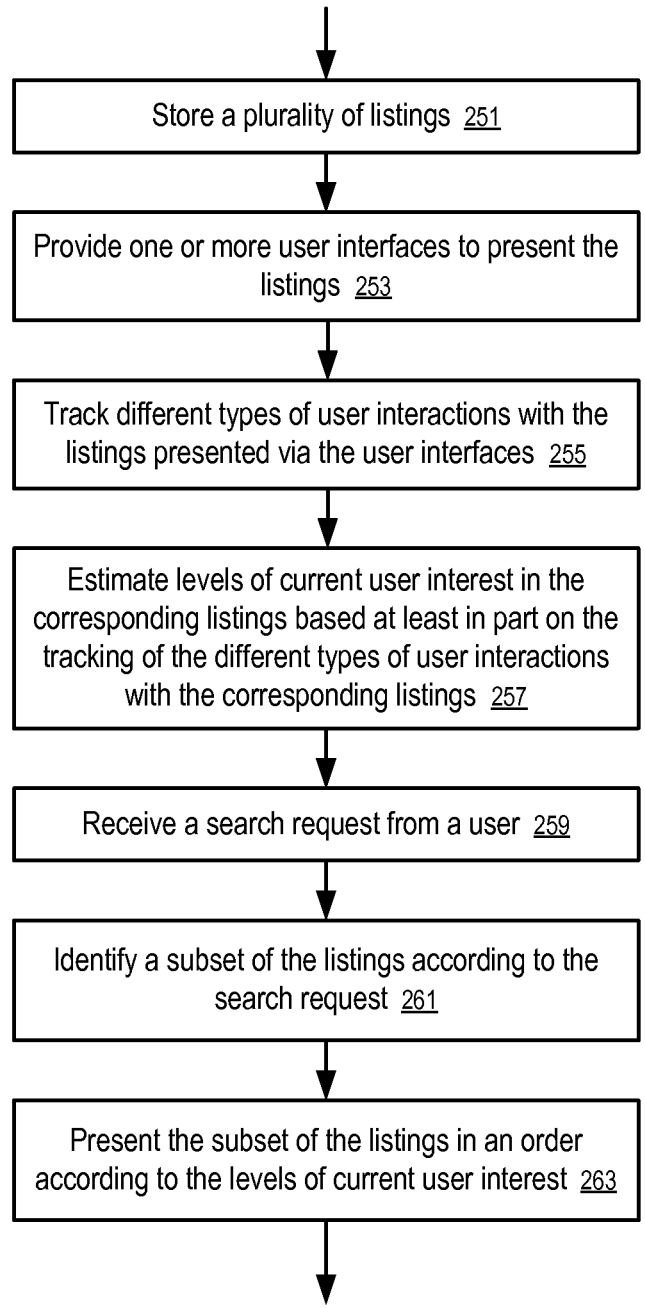
FIG. 9 shows a method to facilitate the presentation of business listings according to one embodiment.

FIG. 9 shows a method to facilitate the presentation of business listings according to one embodiment. In FIG. 9, a data storage facility (123) stores a plurality of listings (121), such as listings (121) of businesses offering products, services, or listings (121) of festival events, entertainment events, etc. In one embodiment, a listing (121) has an associated location (119); and the listing (121) can be used to represent the associated location (119).

The web site (107) and/or the user terminal (103) provides (253) one or more user interfaces (e.g., 150, 200, 210) to present the listings (121) and track (255) different types of user interactions with the listings (121) presented via the user interfaces. For example, the user selections of the links (e.g., 153, 155, 157, and 159) and icon buttons (e.g., 171, 173, 175, 177, 179, 213, 215, and 217) represent different types of user interactions (130) with the presented listing (121) and correspond to different levels of user interest in the listing (121). The user interactions (130) may include bookmarking (133) a listing (121) or adding a listing (121) to favorites, communicating a listing (121) for sharing (132) with a different user, planning (134) an event using a listing (121), obtaining a driving direction to a location identified by a listing (121), providing a user rating (135) above a threshold to a listing (121), performing a search (136) using a name of the listing (121), using a listing (121) to specify a location of interest, or making a reservation or purchase (137, 139) via the listing (121).

The web server (107) or the sorter (117) (or a separate module not shown in FIG. 1, such as an application server) estimates (257) the levels of current user interest in the corresponding listings (121) based at least in part on the tracking of the different types of user interactions with the corresponding listings (121). For example, the data storage facility (123) can store hotlist points (115) to represent estimated levels of user interest in the corresponding listings (121). In one embodiment, the data storage facility (123) stores web logs of access to user interface elements related to the listings (121); and the web server (107) or the sorter (117) (or a separate module not shown in FIG. 1, such as an application server) determines or estimates the levels of current user interest based on the statistics of access to the user interface elements.

After the search engine (113) receives (259) a search request from an end user (101), via the user terminal (103), network (105) and the web server (107), the search engine (113) identifies (261) a subset of the listings (121) according to the search request. The sorter (117) ranks the subset in an order according to the levels of current user interest; and the user terminal (103) receives the subset from the web server (107) and presents (263) the subset of the listings (121) in the order sorted according to the levels of current user interest.

In one embodiment, the search request may include a pre-programmed search criterion. In one embodiment, the search request excludes user specified search criteria. In one embodiment, the search request is based on a location of the user. For example, the end user (101) may request a hot list of listings (121) for businesses that are located near the current location of the user terminal (103), by selecting the hotlist button (205) without specifying a keyword.

In some embodiments, the end user (101) may use different user terminals (103) to submit the search request and receive the search results. For example, the end user (101) may submit a search request via a telephone call and receive the search results via email, SMS, IM, voice mail or a web page. The user terminal (103) may send the search request via a web page, an email, an SMS, or a custom application running on a mobile communication device, such as a cellular phone, which is used as the user terminal (103).

In some embodiments, the search engine (113) receives the search requests and/or sends the search results via servers other than web servers (107), such as via the email gateway (106a), the IM gateway (106b), the telephone gateway (106d), or gateways for SMS, voice mail, fax, television, etc.

In some embodiments, the determination of the level of user interest may also include the contribution from parameters not related to user interactions, such as the status of whether the listing (121) belongs to an advertiser, whether the listing (121) includes a video or banner advertisement, etc.

In one embodiment, the listings (121) provide contact information of business entities, such as telephone contacts provided in business listings (121) of businesses offering services and products.

In one embodiment, the listings (121) provide location information, which can be used by an end user (101) to plan/schedule event.

In one embodiment, the user terminal (103) is a mobile communication device. The data storage facility (123) tracks the user interactions with the listings (121) presented on the same type of mobile communication devices to monitor, determine or estimate the levels of current interest among users of the mobile communication devices in the listings (121). Thus, the estimated levels of the current interest represent collective recommendations by the community of users of the mobile communication devices.

In some embodiments, the user terminal (103) presents a hierarchy of predetermined categories; and the end user (101) can navigate the hierarchy of categories to browse listings (121). In some embodiments, the user terminal (103) presents the listings (121) in the selected categories according to the levels of current interest.

In one embodiment, a predetermined category is based on a type of mobile devices used for presentation (e.g., to see the hot listings collectively recommended by the community of users of the type of mobile devices).

In one embodiment, the web server (107) or the sorter (117) (or a separate module not shown in FIG. 1, such as an application server) weights the user interactions according to a social distance to the end user (101) to customize the determination of the levels of current interest according to the different levels of trust the end user (101) has on users that are separated from the end user (101) by different social distances in an online social network.

Figure 10:
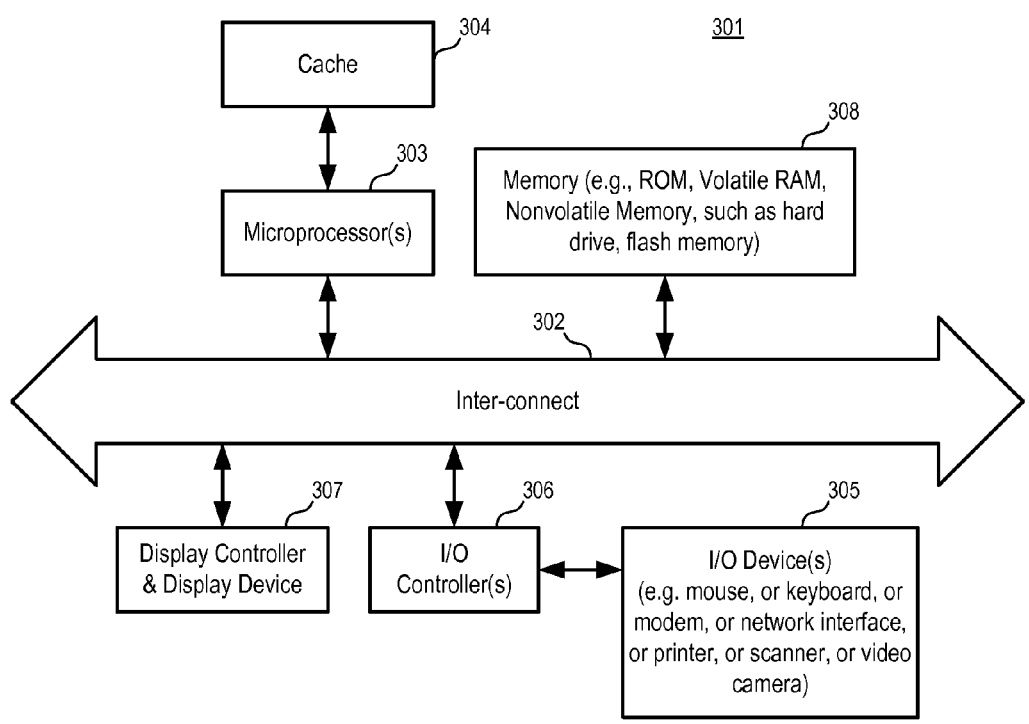
FIG. 10 illustrates a data processing system which can be used in various embodiments.

FIG. 10 illustrates a data processing system which can be used in various embodiments. While FIG. 10 illustrates various components of a computer system, it is not intended to represent any particular architecture or manner of interconnecting the components. Other systems that have fewer or more components may also be used.

In one embodiment, a server data processing system as illustrated in FIG. 10 is used as one of the web server(s) (107), a location detector (111), a search engine (113), a sorter (117), and/or a storage facility (123) for storing hotlist points (115), locations (119) and listings (121), etc. In some embodiments, one or more servers (e.g., 107, 111, 113, 117, 123) of the system can be replaced (e.g., by a system designer) with the service of a peer to peer network of a plurality of data processing systems, or a network of distributed computing systems. The peer to peer network, or a distributed computing system, can be collectively viewed (e.g., by the reader of the description) as a server data processing system.

In one embodiment, a user terminal (103) is a data processing system as illustrated in FIG. 10 to provide the search user interface illustrated in FIG. 3 or the user interfaces illustrated in FIGS. 4-7.

In FIG. 10, the data processing system (301) includes an inter-connect (302) (e.g., bus and system core logic), which interconnects a microprocessor(s) (303) and memory (308). The microprocessor (303) is coupled to cache memory (304) in the example of FIG. 10.

The inter-connect (302) interconnects the microprocessor(s) (303) and the memory (308) together and also interconnects them to a display controller and display device (307) and to peripheral devices such as input/output (I/O) devices (305) through an input/output controller(s) (306). Typical I/O devices include mice, keyboards, modems, network interfaces, printers, scanners, video cameras and other devices which are well known in the art. In some embodiments, when the data processing system is a server system, some of the I/O devices, such as printer, scanner, mice, keyboards are optional.

The inter-connect (302) may include one or more buses connected to one another through various bridges, controllers and/or adapters. In one embodiment the I/O controller (306) includes a USB (Universal Serial Bus) adapter for controlling USB peripherals, and/or an IEEE-1394 bus adapter for controlling IEEE-1394 peripherals.

The memory (308) may include ROM (Read Only Memory), volatile RAM (Random Access Memory), and non-volatile memory, such as hard drive, flash memory, etc.

Volatile RAM is typically implemented as dynamic RAM (DRAM) which requires power continually in order to refresh or maintain the data in the memory. Non-volatile memory is typically a magnetic hard drive, a magnetic optical drive, an optical drive (e.g., a DVD RAM), or other type of memory system which maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used.

In this description, various functions and operations may be described as being performed by or caused by software code to simplify description. However, those skilled in the art will recognize that what is meant by such expressions is that the functions result from execution of the code/instructions by a processor, such as a microprocessor. Alternatively, or in combination, the functions and operations can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While some embodiments can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system or a specific application, component, program, object, module or sequence of instructions referred to as "computer programs". The computer programs typically include one or more instructions set at various times in various memory and storage devices in a computer, and that, when read and executed by one or more processors in a computer, cause the computer to perform operations necessary to execute elements involving the various aspects.

A machine readable medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks (DVDs), etc.), among others. The instructions may be embodied in digital and analog communication links for electrical, optical, acoustical or other forms of propagated signals, such as carrier waves, infrared signals, digital signals, etc.

In general, a machine readable medium includes any mechanism that provides (i.e., stores and/or transmits) information in a form accessible by a machine (e.g., a computer, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by the data processing system.

Although some of the drawings illustrate a number of operations in a particular order, operations which are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A method, comprising:
    storing in a database a plurality of listings;
    transmitting, via a communication network, a set of listings to user devices in response to a plurality of search requests;
    monitoring, via a computing device, a plurality of types of user interactions with the set of listings to gather listing interaction information;
    evaluating, via the computing device, the listing interaction information to determine statistical information for each listing of the set of listings, the statistical information comprising a selection percentile indicative of selections relative to other listings of the set of listings;
    computing, via the computing device and for each listing of the set of listings, a point score representing popularity that is a function of at least:
        the selection percentile indicative of selections relative to other listings of the set of listings, wherein the selections are at least partially based on one or more user selection values; and
        an advertiser value of the listing that corresponds to at least one predetermined subscription level associated with the listing; and
    responsive to a subsequent search request received, via the communication network, selecting, via the computing device, a subset of the set of listings based at least in part on the subsequent search request and a ranking of respective point scores representing popularity, and providing the subset of the set the listings, along with a response to the subsequent search request.

2. The method of claim 1, wherein the point score representing popularity for each listing of the set of listings is based at least in part on a weighted sum of the selection percentile, an average user rating, and the advertiser value.

3. The method of claim 1, wherein the listings provide contact information of business entities.

4. The method of claim 1, wherein the listings provide location information.

5. The method of claim 1, wherein:
    the one or more user devices comprise one or more mobile communication devices; and
    the listing interaction information is based at least in part on at least one listing of the set of listings that was transmitted to the one or more mobile communication devices.

6. The method of claim 5, wherein:
    at least one of the one or more mobile communication devices comprises at least one of a radio for at least one of cellular communications, wireless local area networking, or wireless personal area networking; and
    the listings are received via the radio.

7. The method of claim 1, wherein the search request includes a preprogrammed search criterion.

8. The method of claim 7, wherein the search request excludes user specified search criteria.

9. The method of claim 7, wherein the search request is based on a location corresponding to a user.

10. The method of claim 1, wherein:
    the subset of the set of listings corresponds to a predetermined category;
    the selecting the subset of the set of listings is responsive to the subsequent search request relating to the predetermined category; and
    the subset of the set of listings is ordered according to the ranking of respective point scores representing popularity.

11. The method of claim 10, wherein the predetermined category is based on a type of mobile device used for presentation of the subset of the set of listings.

12. The method of claim 1, wherein the listing interaction information is weighted according to a social distance to a user to determine the point score representing popularity for the respective listing.

13. The method of claim 1, wherein the plurality of types of user interactions includes one or both of bookmarking a listing and adding a listing to favorites.

14. The method of claim 1, wherein the plurality of types of user interactions includes communicating a listing for sharing with a different user.

15. The method of claim 1, wherein the plurality of types of user interactions includes planning an event using a listing.

16. The method of claim 1, wherein the plurality of types of user interactions includes obtaining a driving direction to a location identified by a listing.

17. The method of claim 1, wherein the plurality of types of user interactions includes one or both of providing a user rating above a threshold to a listing and providing an evaluation of a business of a listing.

18. The method of claim 1, wherein the plurality of types of user interactions includes one or both of performing a search using a name of a listing and using a listing to specify a location of interest.

19. The method of claim 1, wherein the plurality of types of user interactions includes one or both of making a reservation and making a purchase using a listing.

20. The method of claim 1, wherein the plurality of types of user interactions includes one or both of viewing detailed information about a business of a listing and viewing a location of a listing on a map.

21. The method of claim 1, wherein the plurality of types of user interactions includes one or both of making a phone call to a business identified by a listing and sending a message to the business identified by the listing.

22. The method of claim 1, wherein the plurality of types of user interactions includes visiting a website of a business identified by a listing.

23. The method of claim 1, wherein the plurality of types of user interactions includes at least one of forwarding, responding to, or investigating a message concerning a listing shared by another.

24. One or more non-transitory machine-readable media storing instructions that, when executed by a computing device, cause the computing device to perform a method, the method comprising:
- storing a plurality of listings;
- providing a set of listings for user devices in response to a plurality of search requests;
- monitoring user interactions with the set of listings to gather listing interaction information;
- evaluating the listing interaction information to determine statistical information for each listing of the set of listings, the statistical information comprising a selection percentile indicative of selections relative to other listings of the set of listings;
- computing, for each listing of the set of listings, a point score representing popularity that is a function of at least:
  - the selection percentile indicative of selections relative to other listings of the set of listings, wherein the selections are at least partially based on one or more user selection values; and
  - an advertiser value of the listing that corresponds to at least one predetermined subscription level associated with the listing; and
- responsive to a subsequent search request receive, selecting a subset of the set of listings based at least in part on the subsequent search request and a ranking of respective point scores representing popularity, and providing the subset of the set of listings, along with a response to the subsequent search request.

25. A system, comprising:
- one or more storage media configured to store a plurality of listings; and
- one or more processors coupled to the one or more storage media, the one or more processors to execute instructions to:
  - provide a set of listings for user devices in response to a plurality of search requests;
  - monitor a plurality of types of user interactions with the set of listings to gather listing interaction information;
  - evaluate the listing interaction information to determine statistical information for each listing of the set of listings, the statistical information comprising a selection percentile indicative of selections relative to other listings of the set of listings;
  - compute, for each listing of the set of listings, a point score representing popularity that is a function of at least:
    - the selection percentile indicative of selections relative to other listings of the set of listings, wherein the selections are at least partially based on one or more user selection values; and
    - an advertiser value of the listing that corresponds to at least one predetermined subscription level associated with the listing; and
  - responsive to a subsequent search request received, select a subset of the set of listings based at least in part on the subsequent search request and a ranking of respective point scores representing popularity, and provide the subset of the set of listings, along with a response to the subsequent search request.

* * * * *